(12) United States Patent
Hall et al.

(10) Patent No.: US 9,541,640 B2
(45) Date of Patent: Jan. 10, 2017

(54) GROUND PENETRATING RADAR WITH VARIABLE DWELL TIME

(71) Applicant: David R. Hall, Provo, UT (US)

(72) Inventors: David R. Hall, Provo, UT (US); David C. Wahlquist, Spanish Fork, UT (US); Don Lefevre, Rapid City, SD (US)

( * ) Notice: Subject to any disclaimer, the term of this patent is extended or adjusted under 35 U.S.C. 154(b) by 490 days.

(21) Appl. No.: 13/956,034

(22) Filed: Jul. 31, 2013

(65) Prior Publication Data
US 2015/0035693 A1 Feb. 5, 2015

Related U.S. Application Data

(60) Provisional application No. 61/678,377, filed on Aug. 1, 2012.

(51) Int. Cl.
*G01S 13/88* (2006.01)
*G01S 7/28* (2006.01)
*G01S 13/10* (2006.01)

(52) U.S. Cl.
CPC .............. *G01S 13/885* (2013.01); *G01S 7/28* (2013.01); *G01S 13/103* (2013.01)

(58) Field of Classification Search
CPC ......... G01S 13/103; G01S 13/885; G01S 7/28
USPC ........................................................ 342/22
See application file for complete search history.

(56) References Cited

U.S. PATENT DOCUMENTS

| 4,620,192 A | * | 10/1986 | Collins | G01S 13/34 342/128 |
| 5,177,488 A | * | 1/1993 | Wang | G01S 7/4052 250/227.12 |
| 5,835,054 A | | 11/1998 | Warhus et al. | |
| 5,905,455 A | * | 5/1999 | Heger | G01S 7/03 342/142 |
| 6,121,915 A | | 9/2000 | Cooper et al. | |
| 6,496,137 B1 | | 12/2002 | Johansson | |
| 7,362,420 B2 | * | 4/2008 | Zaugg | G01S 17/08 356/4.01 |
| 2010/0052969 A1 | * | 3/2010 | Niktash | G01S 13/885 342/22 |
| 2011/0012774 A1 | * | 1/2011 | Sakai | G01S 7/4021 342/145 |
| 2011/0268503 A1 | * | 11/2011 | Hall | E01C 23/01 404/90 |
| 2012/0256778 A1 | * | 10/2012 | Labitt | G01S 7/2928 342/70 |

\* cited by examiner

*Primary Examiner* — Timothy A Brainard
(74) *Attorney, Agent, or Firm* — Philip W. Townsend, III

(57) ABSTRACT

An object detection system may be capable of sensing a buried object and providing an estimate of the object's depth. The object detection system may comprise a signal generator transmitting one or more signals. At least one of the signals may be directed toward the buried object and reflected off of the object back to the system. At least one of the signals may be transmitted along a variable length path. A correlator may then receive the signals and determine an offset between their arrival times at the correlator. The variable length path may then be adjusted over a range which includes a minimum offset indicating a distance to the object.

18 Claims, 8 Drawing Sheets

GROUND PENETRATING RADAR WITH VARIABLE DWELL TIME

CROSS REFERENCE TO RELATED APPLICATIONS

This application claims priority to U.S. Provisional Pat. App. No. 61/678,377 filed on Aug. 1, 2012, which is incorporated herein by reference for all that it contains.

BACKGROUND OF THE INVENTION

The present invention relates to Ground Penetrating Radar (GPR) systems, and more particularly, to timing within GPR systems.

GPR systems often comprise at least one transmitter that transmits an electromagnetic impulse. The transmitted impulse may reflect off of a buried object to create a reflected electromagnetic waveform. At least one receiver may receive the reflected waveform to collect information about the object. Difficulty arises, however, in accurately scheduling the time when each transmitter transmits an impulse signal and when each receiver samples a received waveform.

U.S. Pat. No. 6,496,137 to Johansson, which is herein incorporated by reference for all that it contains, describes a GPR timing system comprising a control circuit that receives a transmit timing input signal and a receive timing input signal. The system delays the transmit timing input signal and generates a number of intermediate transmit timing signals delayed with respect to each other by a delay time, selects either the transmit timing input signal or a corresponding one of the intermediate transmit timing signals as a corresponding output transmit timing signal, delays the receive timing input signal and generates a number of intermediate receive timing signals delayed with respect to each other by the delay time, adds the delay time to the intermediate receive timing signals, and selects either the receive timing input signal or a corresponding one of the intermediate receive timing signals as a corresponding output receive timing signal.

U.S. Pat. No. 5,835,054 to Warhus, et al., which is herein incorporated by reference for all that it contains, describes how the accuracy of a calculation of distances using a GPR system depends on how precisely a time-delay of echoes can be measured. Ideally, each returned echo is a scaled and time-shifted version of the transmitted pulse. Thus, a reference point on the pulse can be used to calculate the time-delay, e.g., either the leading or trailing edge of the pulse. In the presence of noise, however, such reference points can be hard to determine. Correlation or inverse filtering of the incoming signal with the transmitted pulse can be used to produce a peak at the time-delay of the echo and provide a reference point that is much easier to locate.

Despite these advances, simplified means for timing GPR systems is desirable.

BRIEF SUMMARY OF THE INVENTION

An object detection system may be capable of sensing a buried object and providing an estimate of the object's depth. The object detection system may comprise a signal generator transmitting one or more signals. At least one of the signals may be directed toward the buried object and reflected off of the object back to the system. At least one of the signals may be transmitted along a variable length path. A correlator may then receive the signals and determine an offset between their arrival times at the correlator. The variable length path may then be adjusted over a range which includes a minimum offset indicating a distance to the object.

In various embodiments of the invention, the signals may be generated concurrently, as substantially identical and/or random signals.

In order to direct a signal toward the buried object, the system may comprise a transmitter/receiver device for transmitting at least one of the signals toward the object and receiving a reflected signal from the object. The transmitter/receiver device may comprise a single antenna, or separate antennas may be used for transmission and reception.

In order to adjust a length of the variable length path, the system may comprise a plurality of delays that may be individually incorporated into the variable length path. For example, each of the plurality of delays may comprise a length of wire or transmission line such as a coaxial cable, microstrip transmission line, stripline, or other types of transmission line known in the art. The lengths of wire or transmission lines may each be of equal length or of different lengths. A switch may incorporate one of the plurality of delays into the variable length path to alter the length of the variable length path. In such an embodiment, the plurality of delays may be connected in parallel. In other embodiments, each of the plurality of delays may comprise its own switch that may incorporate each delay into the variable length path. Such delays and switches may be connected in series. Also, groups of delays may be connected with other groups of delays with series or parallel connections between the groups.

Another means to adjust the length of the variable length path may be a slidable link, or continuously-adjustable delay line, such as an adjustable coaxial delay line, or other adjustable-length transmission lines, often known as 'trombones,' capable of altering the length of the variable length path.

Such various adjustment means may be controlled by an operator or automatically adjusted by a delay control. Alternatively, a delay control may adjust a time axis of a display.

In various embodiments, the object detection system may be secured to a vehicle. The vehicle may further comprise a degradation drum that may comprise a plurality of picks disposed around an outer perimeter thereof and that may be rotated such that the plurality of picks engage and degrade a surface. A height of the drum may be adjusted to avoid engaging the object. The object detection system may also be secured to a handheld frame.

DETAILED DESCRIPTION OF THE INVENTION

Figure 1:
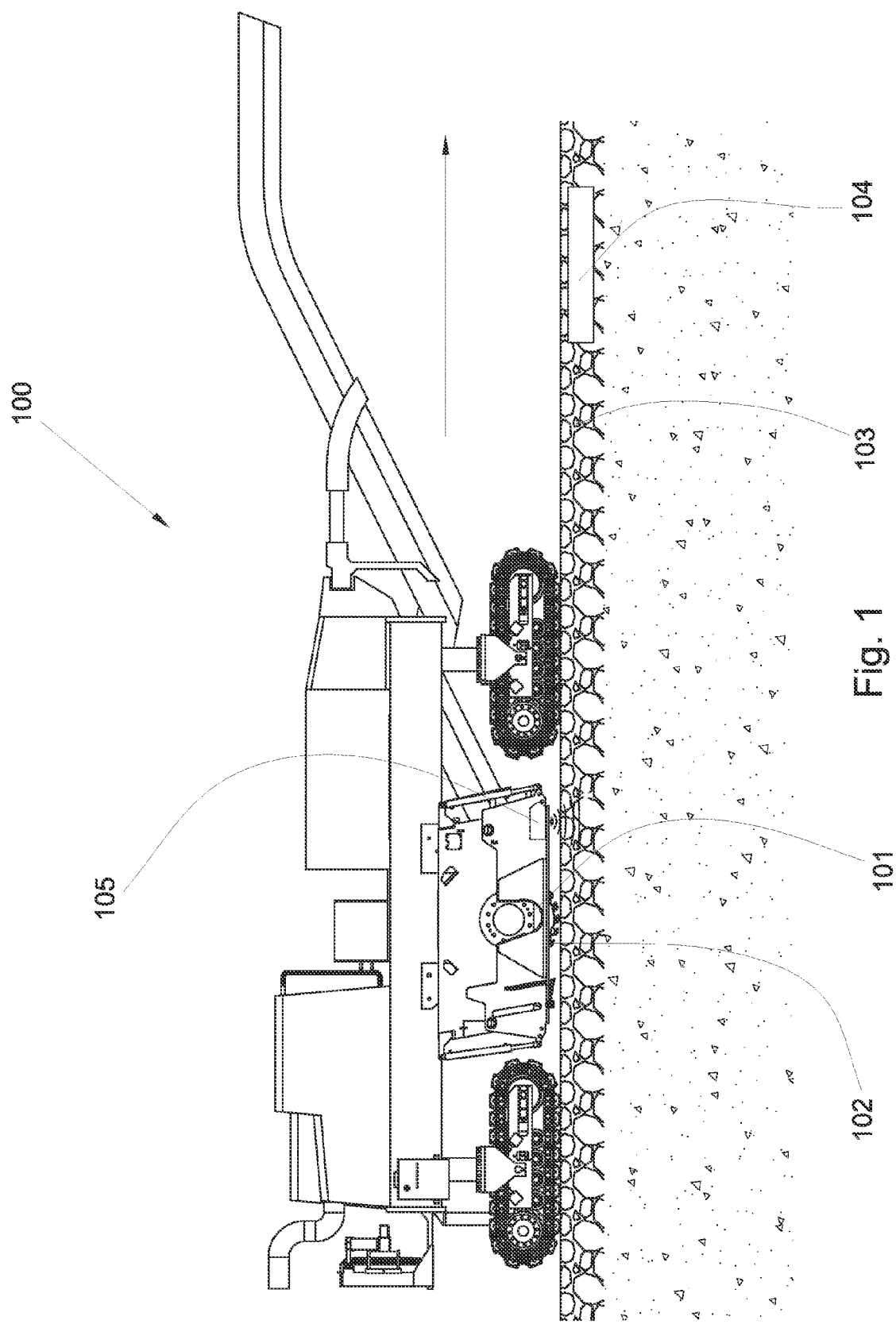
FIG. 1 is an orthogonal view of an embodiment of a vehicle comprising an object detection system disposed thereon.

FIG. 1 discloses an embodiment of vehicle 100, such as a milling machine, traveling over a paved surface 103, such as asphalt or concrete. A degradation drum 101 comprising a plurality of picks 102 disposed around an outer perimeter thereof may be secured to an underside of the vehicle 100. The degradation drum 101 may be rotated such that the plurality of picks 102 engage and degrade the paved surface 103.

Objects 104 such as rebar, railroad tracks and manhole covers may be buried beneath the paved surface 103 and may damage the picks 102 during degradation operations. To prevent damage to the picks 102, an object detection system 105 comprising a ground penetrating radar unit may be disposed on the vehicle 100 to locate and collect information about the objects 104. A height of the degradation drum 101 or the vehicle 100 may be adjusted to avoid engaging the objects 104 with the picks 102.

Figure 2:
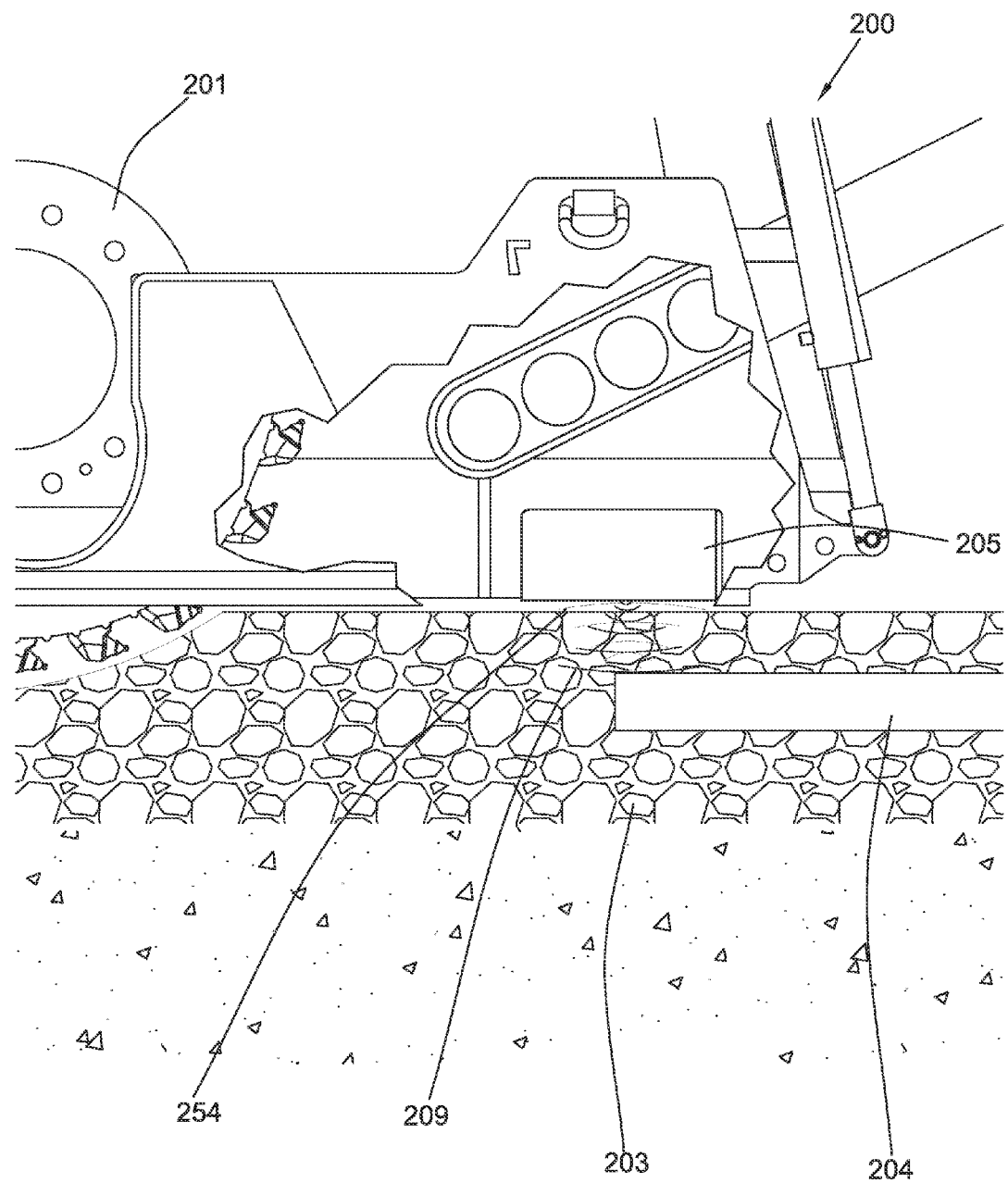
FIG. 2 is a cutaway view of an embodiment of an object detection system disposed on a vehicle.

FIG. 2 discloses an embodiment of a vehicle 200 similar to the one referenced in the discussion of FIG. 1 comprising a degradation drum 201 secured to an underside thereof. An object detection system 205 may be secured on the vehicle 200 forward of the degradation drum 201. The object detection system 205 may locate buried objects 204 prior to them being engaged by the degradation drum 201 by transmitting radio waves 209 into a subsurface region 203 within which the buried objects 204 may be located and collecting reflected waves 254 that may reflect off of the buried objects 204. The time required for the reflected waves 254 to return to the object detection system 205 may be used to estimate a distance to the buried objects 204.

Figure 3:
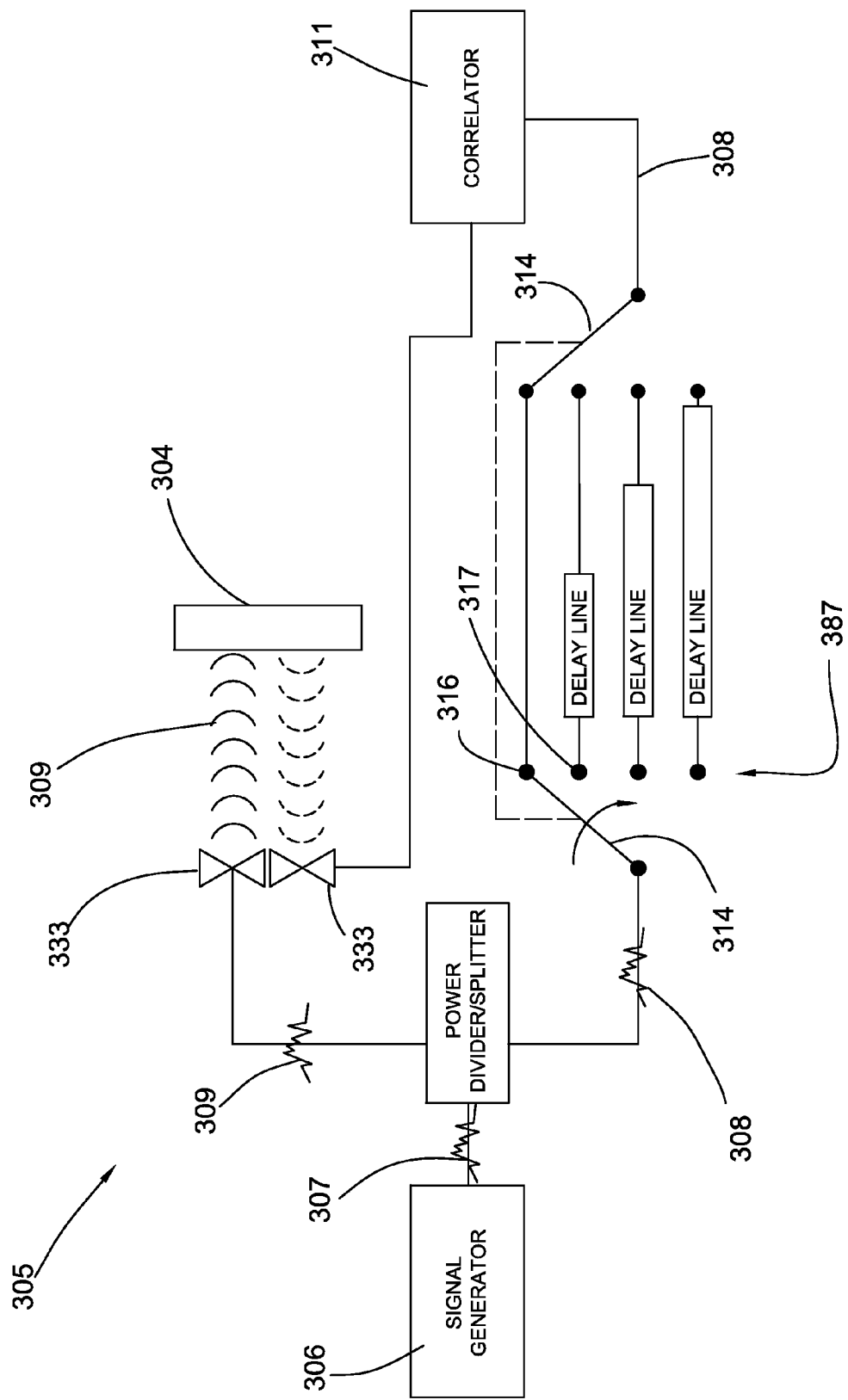
FIG. 3 is a schematic block diagram of an embodiment of an object detection system.

FIG. 3 discloses an embodiment of an object detection system 305 in schematic form. Wire connections are shown between circuit elements, however, those of skill in the art will recognize that lower frequency radio signals may be carried on short wires while higher frequency radio signals may be carried on transmission lines such as microstrip, stripline, coaxial cables, or other types of transmission lines. In the embodiment shown, the object detection system 305 comprises a signal generator 306 that may transmit one or more signals 307. The signals 307, after being split by a power divider or splitter, may travel along two distinct paths to a correlator 311 that may compare the signals 307 to determine the relative delays between the paths traveled.

For example, a first signal 308 may travel along a variable length path comprising a switch 314 and a plurality of switch contacts 387. Each of the plurality of switch contacts 387 may correspond to a different length of path. As the switch 314 is actuated the length of the path may vary.

A second signal 309 may travel along a path including a transmitter/receiver device 333, such as an antenna, that may transmit the second signal 309 toward an object 304. The second signal 309 may reflect off of the object 304 and be received again by the transmitter/receiver device 333.

If the first signal 308 and second signal 309 are substantially in phase when they reach the correlator 311 then they may have traveled a substantially related distance. If the first signal 308 and second signal 309 are not substantially in phase when they reach the correlator 311 then the switch 314 may be actuated to check a variety of preset distances for a better fit. For example, a first switch contact 316 may correspond to a short distance. If the first signal 308 and second signal 309 are not substantially in phase, the switch 314 may be changed from the first switch contact 316 to a second contact 317 that may correspond to a longer distance. If the first signal 308 and second signal 309 are now substantially in phase then a correlation value determined by the correlator will increase and a distance to the object 304 may be estimated by determining the delay difference between the two paths.

Figure 4:
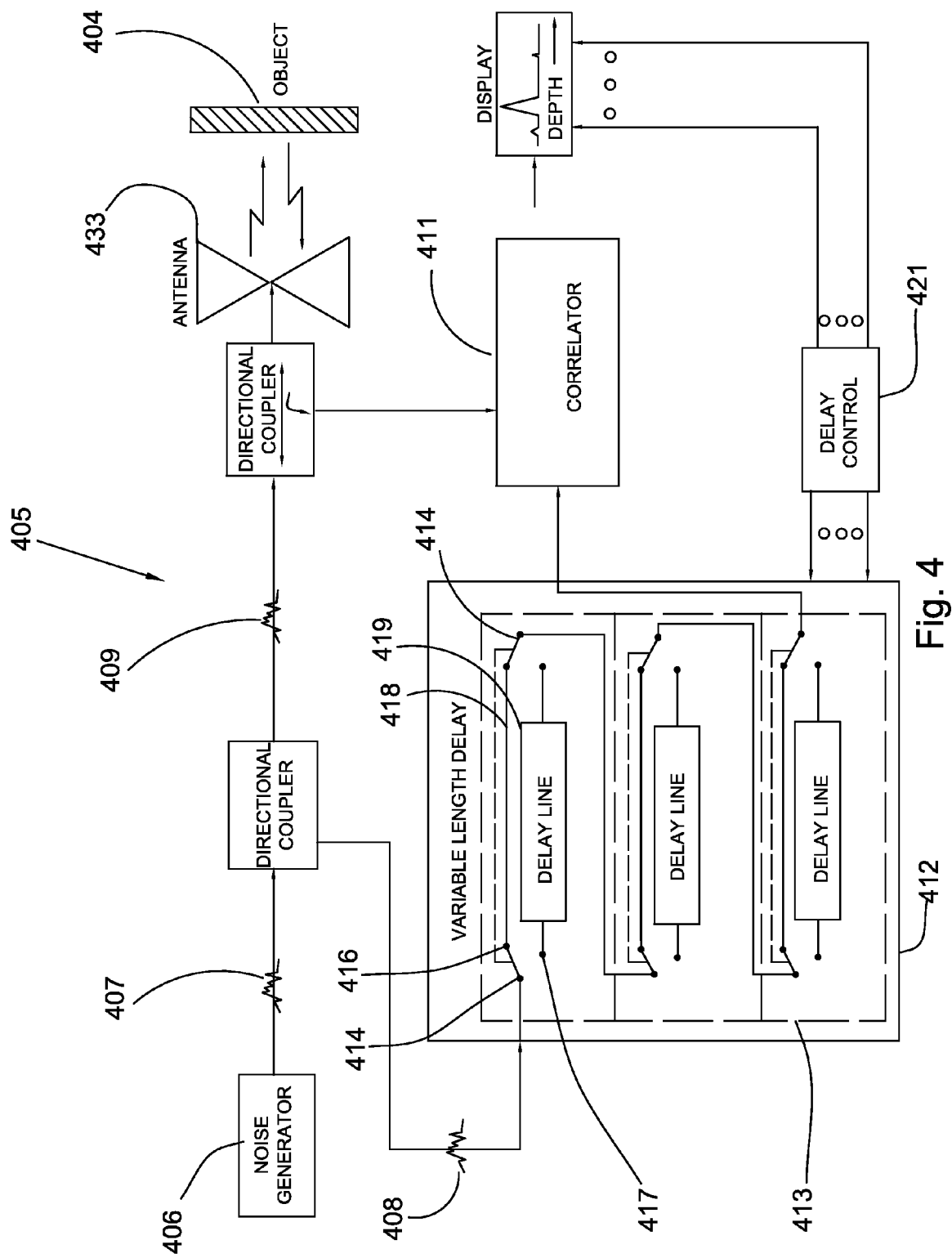
FIG. 4 is another schematic block diagram of an embodiment of an object detection system.

FIG. 4 discloses an embodiment of another style of object detection system 405 in schematic form. The object detection system 405 may comprise a signal generator 406 that may transmit one or more signals 407. Similar to the embodiment shown in FIG. 3, the signals 407 may travel along two distinct paths to a correlator 411 where they may be compared to determine relative time differences or differences in the lengths of the paths traveled. However, in this embodiment, a first signal 408 may travel along a variable length path made adjustable by a variable length delay 412. The variable length delay 412 may comprise a plurality of individual delays 413 that may be uniquely controlled to create a desired path length.

For example, by actuating a switch 414 the first signal 408 may be conducted through a first switch contact 416 and thus along a first wire or transmission line 418 of insignificant length or through a second switch contact 417 and thus along a second wire or transmission line 419 of significant length. The individual delays 413 may be connected in series such that each may further lengthen the path traveled by the first signal 408. An increased number of delays 413 may improve the accuracy and range of the object detection system 405.

Similar to the embodiment shown in FIG. 3, a second signal 409 may travel along a path including a transmitter/receiver device 433 that may transmit the second signal 409 toward an object 404. The transmitter/receiver device 433 may comprise a broadband antenna, a bowtie antenna, or other antennae known in the art. The second signal 409 may reflect off of the object 404 and be received again by the transmitter/receiver device 433. The transmitter/receiver device 433 may comprise a single antenna which both transmits and receives or two antennas, one for transmitting and one for receiving. It should be appreciated that for simplicity, only the most essential devices are shown in the schematics. Additional circuit elements, such as RF amplifiers, filters, etc., may be added to the basic embodiments to improve performance.

The first signal 408 and second signal 409 may have a time offset upon their arrival at the correlator 411 that may be due to the relative difference in distances and velocities of propagation over which the two signals traveled. A delay control 421 may automatically adjust the variable length delay 412 to find the closest fit allowing for a distance to the object 404 to be estimated. The delay control may also be used to control a time-axis of a display device that shows correlation or the return signal as a function of time.

Figure 5:
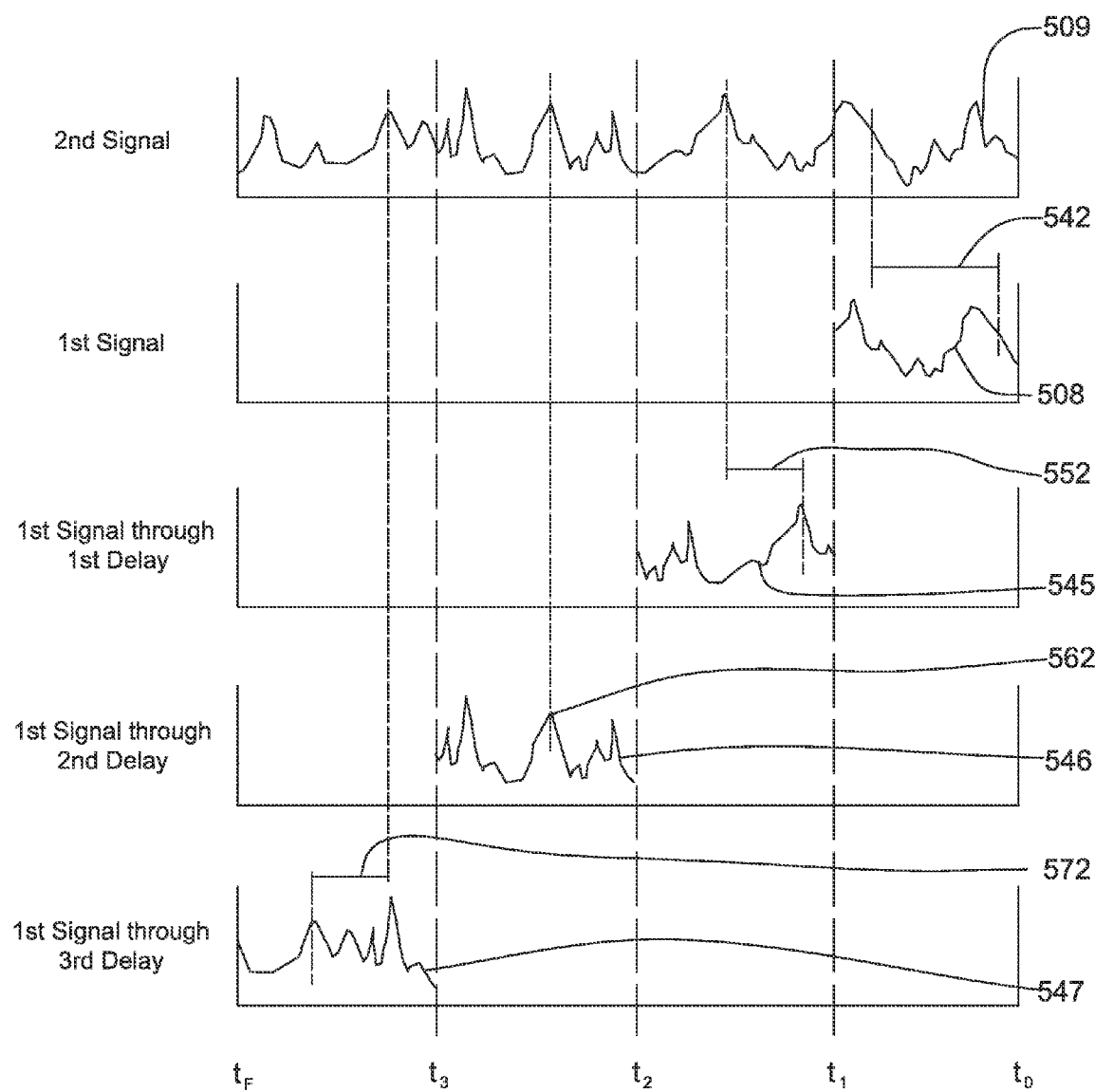
FIG. 5 is a graph of an embodiment of a plurality of signals.

FIG. 5 discloses graphs representing embodiments of first and second signals as they may arrive at a correlator as described in relation to FIGS. 3 and 4 above. In the graphs shown, time is represented on x-axes while signal amplitude is represented on y-axes. Additionally, $t_0$ represents a minimum additional delay while $t_m$ represents a maximum additional delay. Times $t_1$-$t_3$ represent various additional delays between the minimum and maximum additional delays.

A second signal 509 may travel along a path including a round trip to and from a buried object. To estimate a distance to the buried object, the second signal 509 may be compared to a first signal 508 that may travel along a path of known length. Due to differences between the distance to the buried object and the known length, an offset 542 may exist between the first signal 508 and second signal 509 as they arrive at a correlator. A switch may actuate to divert the first signal 508 through a first distance of wire, transmission line, or first delay, that will alter the distance the first signal 508 travels before reaching the correlator. Due to the altered distance, the first signal through first delay 545 may comprise an offset 552 from the second signal 509 different from that of the first signal 508 without any additional delay. In a like manner, the switch may be further actuated to pass the first signal 508 through a plurality of delays of known distances or time delays. After each actuation of the switch, a delayed first signal may be compared to the second signal 509. While the present embodiment shows three delays, any number of delays is contemplated.

In this embodiment, an offset 562 of the first signal through second delay 546 from the second signal 509 is substantially smaller than an offset 552 of the first signal through first delay 545 or offset 572 of the first signal through third delay 547. Thus, the distance to a buried object may be estimated based on the known distance of the second delay.

The correlator may function by combining at least two signals, such as the first and second signals as described in relation to FIGS. 3 and 4, and measuring the correlation. A stronger correlation indicates a smaller offset and therefore a smaller difference between the two signals. The simplicity of the correlator, as compared to many of the timing systems currently used in the prior art, allows for a variety of signal types to be used with the present invention. Even random signals may be used as signals.

Figure 6:
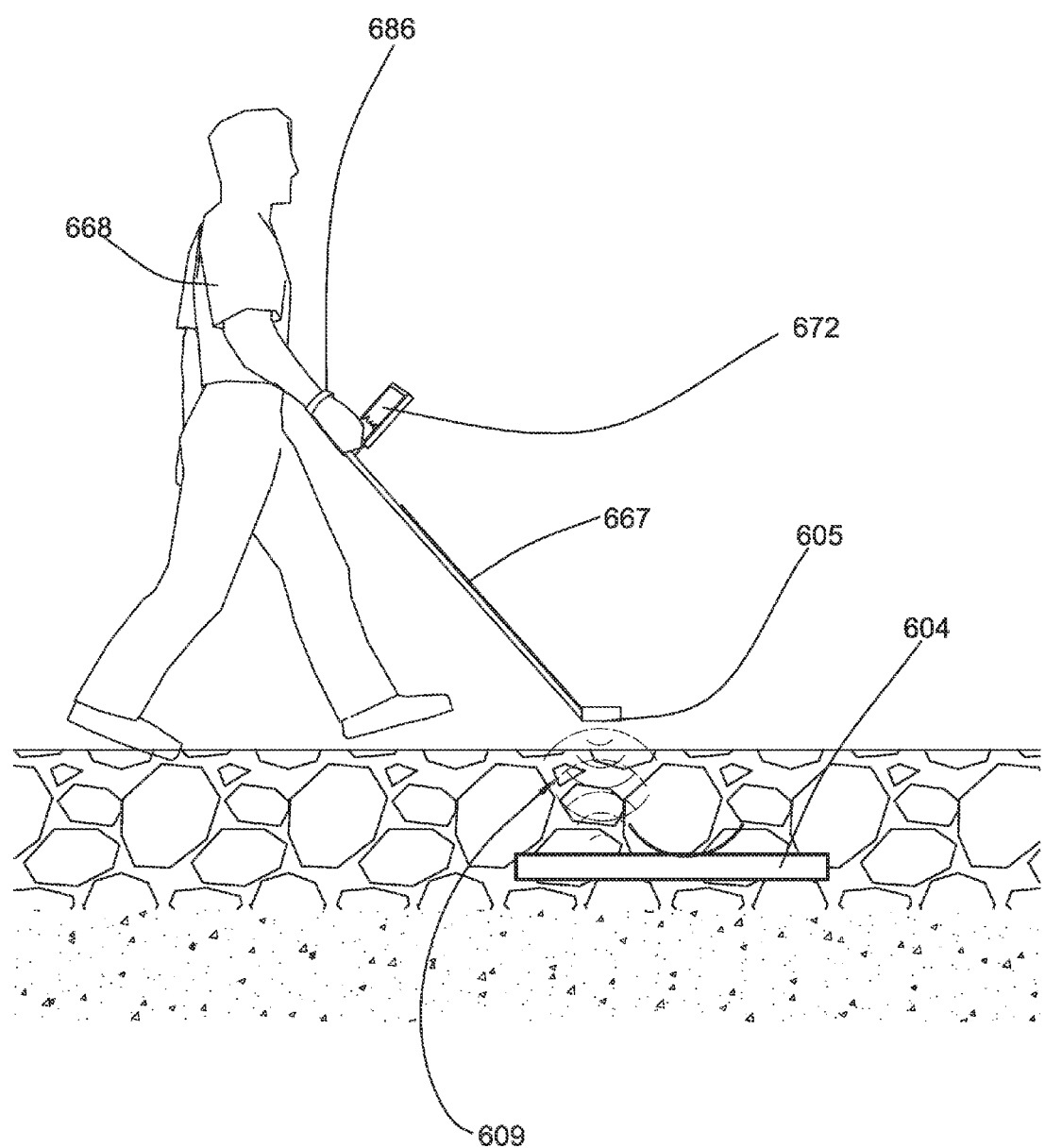
FIG. 6 is an orthogonal view of an embodiment of a handheld object detection system.

FIG. 6 discloses an embodiment of a handheld object detection system 605. An elongate frame 667 may be carried by an operator 668 by means of a handle 686. The object detection system 605 may be disposed at an opposite end of the elongate frame 667 from the handle 686. The object detection system 605 may locate buried objects 604 by transmitting radio waves and collecting reflected waves 609 that may reflect off of the buried objects 604. The time required for the reflected waves 609 to return to the object detection system 605 may be used to estimate a distance to the buried objects 604. A display 672 may also be disposed on the elongate frame 667 to show a distance to the objects 604.

Figure 7:
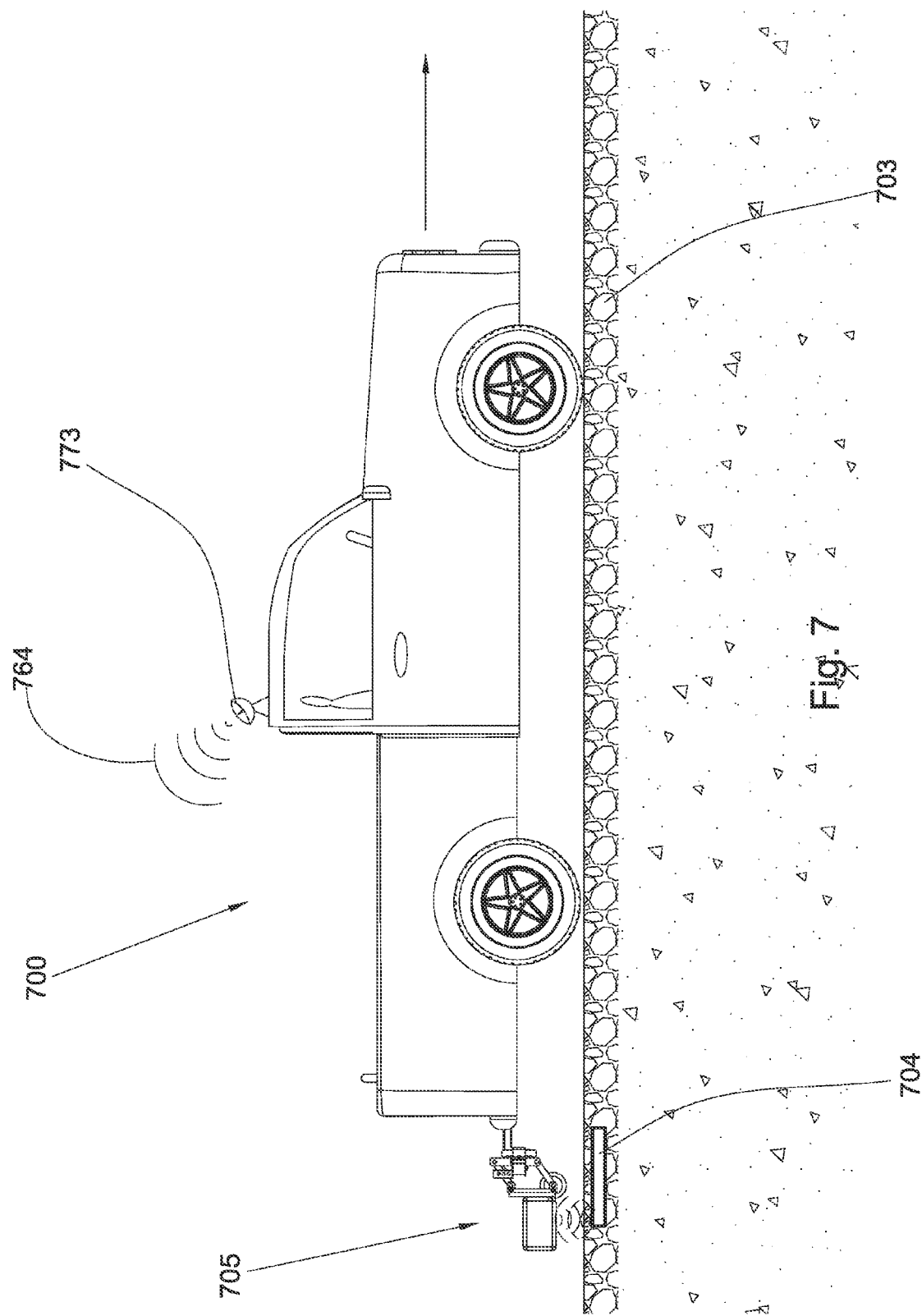
FIG. 7 is an orthogonal view of an embodiment of a truck comprising an object detection system.

FIG. 7 discloses an embodiment of an object detection system 705 attached to a vehicle 700, such as a truck. The vehicle 700 may drive over a paved surface 703 to be degraded. The object detection system 705 may locate objects 704 buried beneath the paved surface 703. A transmitter device 773 may be mounted to the vehicle 700. The object detection system 705 may send data 764 containing locations of the objects 704 beneath the paved surface 703 to a computing device (not shown) via the transmitter device 773. The computing device may record the data for a reference when degrading the paved surface 703.

Figure 8:
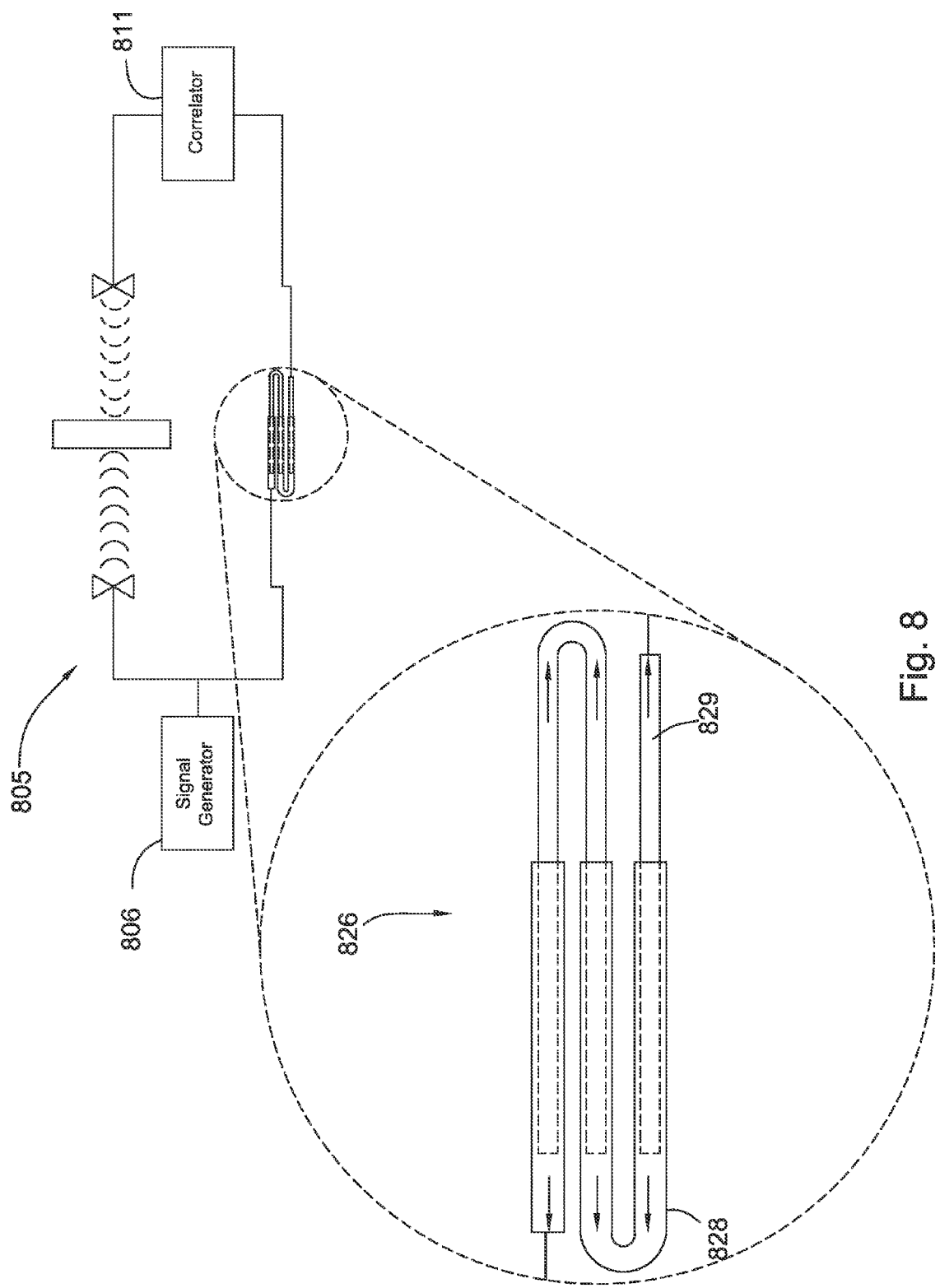
FIG. 8 is a schematic block diagram of an object detection system.

FIG. 8 discloses an embodiment of an object detection system 805 in schematic form comprising a variable length between a signal generator 806 and a correlator 811. The variable length may be formed by a telescoping wire or transmission line component comprising a slidable link 826. The slidable link 826 may comprise a first part 828 that may slide with respect to, while maintaining contact with, a second part 829 thus changing the length of the slidable link 826 and a distance a signal may travel from the signal generator 806 to the correlator 811.

Whereas the present invention has been described in particular relation to the drawings attached hereto, it should be understood that other and further modifications apart from those shown or suggested herein, may be made within the scope and spirit of the present invention.

What is claimed is:

1. An object detection system, comprising:
    a random signal generator transmitting one or more random continually varying analog signals;
    at least one of the random continually varying analog signals transmitted along a variable physical-distance path comprising a length of wire;
    at least one of the random continually varying analog signals directed toward an object and reflected by the object;
    a correlator receiving at least two of the random continually varying analog signals;
    an offset between arrival times of the at least two random continually varying analog signals received by the correlator; and
    wherein the variable physical-distance path is adjustable over a range which includes a minimum offset indicating a distance to the object.

2. The system of claim 1, wherein a first signal is transmitted along the variable physical-distance path, a second signal is directed toward the object and the first and second signals are substantially identical.

3. The system of claim 1, wherein a first signal is transmitted along the variable physical-distance path, a second signal is directed toward the object and the first and second signals are generated concurrently.

4. The system of claim 1, further comprising a transmitter/receiver device for transmitting at least one of the signals toward the object and receiving a reflected signal from the object.

5. The system of claim 4, wherein the transmitter/receiver device comprises at least one antenna.

6. The system of claim 1, further comprising a plurality of physical-distance delays that may be individually incorporated into the variable physical-distance path to alter a physical distance of the variable physical-distance path.

7. The system of claim 6, wherein each of the plurality of physical-distance delays comprises a length of wire of different length.

8. The system of claim 6, further comprising a switch that incorporates one of the plurality of physical-distance delays into the variable physical-distance path to alter the physical distance of the variable physical-distance path.

9. The system of claim 8, wherein the plurality of physical-distance delays are connected in parallel.

10. The system of claim 6, wherein each of the plurality of physical-distance delays comprises a switch that incorporates that delay into the variable physical-distance path to alter the physical distance of the variable physical-distance path.

11. The system of claim 10, wherein the plurality of physical-distance delays are connected in series.

12. The system of claim 6, wherein parallel groups of the plurality of physical-distance delays are connected in series.

13. The system of claim 1, further comprising a slidable link or continuously-adjustable delay line capable of altering the physical distance of the variable physical-distance path.

14. The system of claim 1, further comprising a delay control to automatically adjust the variable physical-distance path.

15. The system of claim 1, further comprising a delay control to adjust a time axis of a display.

16. The system of claim 1, secured to a vehicle.

17. The system of claim 16, wherein the vehicle further comprises a degradation drum wherein a height of the degradation drum is adjustable to avoid engaging the object.

18. The system of claim 1, secured to a handheld frame.

* * * * *